United States Patent
Prince et al.

(10) Patent No.: US 11,798,318 B2
(45) Date of Patent: Oct. 24, 2023

(54) DETECTION OF KINETIC EVENTS AND MECHANICAL VARIABLES FROM UNCALIBRATED VIDEO

(71) Applicant: QualiaOS, Inc., Los Angeles, CA (US)

(72) Inventors: Kevin John Prince, Brooklyn, NY (US); Carlos Dietrich, Porto Alegre (BR); Justin Ali Kennedy, Norwell, MA (US)

(73) Assignee: QualiaOS, Inc., Los Angeles, CA (US)

( * ) Notice: Subject to any disclaimer, the term of this patent is extended or adjusted under 35 U.S.C. 154(b) by 0 days.

(21) Appl. No.: 17/389,848

(22) Filed: Jul. 30, 2021

(65) Prior Publication Data
US 2022/0036052 A1 Feb. 3, 2022

Related U.S. Application Data

(60) Provisional application No. 63/059,599, filed on Jul. 31, 2020.

(51) Int. Cl.
| | |
|---|---|
| *G06T 7/80* | (2017.01) |
| *G06V 40/20* | (2022.01) |
| *G06T 7/215* | (2017.01) |
| *A63B 24/00* | (2006.01) |
| *G06V 20/40* | (2022.01) |

(52) U.S. Cl.
CPC .......... *G06V 40/23* (2022.01); *A63B 24/0006* (2013.01); *G06T 7/215* (2017.01); *G06V 20/42* (2022.01); *G06V 20/46* (2022.01); *G06V 40/28* (2022.01)

(58) Field of Classification Search
CPC ........ G06V 40/23; G06V 20/46; G06V 40/28; G06V 20/42; G06T 7/215; A63B 24/0006
See application file for complete search history.

(56) References Cited

U.S. PATENT DOCUMENTS

| | | | | |
|---|---|---|---|---|
| 2004/0017372 | A1* | 1/2004 | Park | G06T 7/246 345/475 |
| 2010/0195867 | A1* | 8/2010 | Kipman | G06F 3/01 382/103 |
| 2015/0324636 | A1* | 11/2015 | Bentley | A63F 13/212 386/227 |
| 2018/0068178 | A1* | 3/2018 | Theobalt | G06T 13/40 |
| 2020/0125852 | A1* | 4/2020 | Carreira | G06N 3/049 |
| 2020/0205697 | A1 | 7/2020 | Zheng | |

FOREIGN PATENT DOCUMENTS

| | | | |
|---|---|---|---|
| JP | 2014085933 A | * | 5/2014 |
| WO | 2017011817 A1 | | 1/2017 |

OTHER PUBLICATIONS

International Search Report and Written Opinion for App. No. PCT/US2021/044050, dated Nov. 18, 2021, 14 pages.
International Preliminary Report on Patentability issued in App. No. PCT/US2021/044050, dated Feb. 9, 2023, 9 pages.

* cited by examiner

*Primary Examiner* — Syed Haider
(74) *Attorney, Agent, or Firm* — Butzel Long

(57) ABSTRACT

Systems and techniques are provided to identify, analyze, and evaluate key events and mechanical variables in videos of human motion related to an action, such as may be used in training for various sports and other activities. Information about the action is calculated based on analysis of the video such as via keypoint identification, pose identification and/or estimation, and related calculations, and provided automatically to the user to allow for improvement of the action.

41 Claims, 13 Drawing Sheets

Database of Signatures of Pitches

540  "Pitch 0"   "Pitch 1"   "Pitch 2"   ...

Analysis of the Matching Probability Between the Time Series of 2D Poses and the Pitch Signatures

550

770 —

Proper balance is defined as your head being over your center of gravity throughout your throwing motion.

There should be fewer than 15 degrees of head movement away from the center of gravity at release.

You'll be more accurate, throw harder, release the ball closer to the plate, and stay healthier. One inch of inappropriate head movement loses you 2 inches of distance towards home plate at release.

Keep your back foot on the ground into release point, dragging to two of your feet from the rubber.

Suggested Drills

780 —

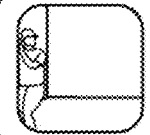 Crossover

 Step Behinds

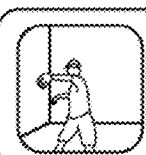 Torque Toss Holds

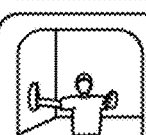 Knee Drill Holds

FIG. 7D

DETECTION OF KINETIC EVENTS AND MECHANICAL VARIABLES FROM UNCALIBRATED VIDEO

CROSS-REFERENCE TO RELATED APPLICATIONS

This application claims the priority benefit of U.S. Provisional Application No. 63/059,599 filed Jul. 31, 2020, the disclosure of which is incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate to computer-based capture, identification, and calculation of various events and mechanical variables related to performance of a kinetic action, such as a repeatable physical activity, using video that can be taken from an arbitrary point of view relative to the activity.

BACKGROUND

Conventional training techniques in many sports are often reliant on human observation and judgment. For example, in training a baseball pitcher, a coach will often observe the pitcher's form throughout a pitch or series of pitches and attempt to instruct the pitcher on ways to improve the form. Such techniques require the coach to be able to judge the pitcher's form over a very small time span at very high accuracy in order to give useful instruction. Other sports and activities include similar coaching and training techniques for similar repeated actions.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 7A, 7B, 7C, and 7D show examples of data calculated based on captured video as disclosed herein and user interfaces for displaying the same.

DETAILED DESCRIPTION

Embodiments disclosed herein provide systems and techniques to identify, analyze, and evaluate key events and mechanical variables in videos of human motion, such as may be used in training for various sports and other activities. For example, one or more videos of a baseball pitcher may be analyzed to identify key kinetic events during the pitch, compute mechanical variables of the kinetic motion, determine a camera location from which the video was taken, and/or recognize when the pitch begins and ends. The video(s) may be taken from arbitrary locations relative to the pitcher without requiring calibration or specific arrangement relative to the pitcher. In other examples, equivalent analyses may be performed using one or more uncalibrated videos of a golf swing, a boxing stance or punch, a basketball freethrow, a hockey slapshot, a tennis swing, or the like. More generally, techniques disclosed herein may be applied to any discrete identifiable physical action made by a human. Although examples herein are provided in terms of a baseball pitch or other action specific to an individual sport, the same techniques and systems may be used for other such actions and activities without departing from the scope or content of the invention.

Figure 1:
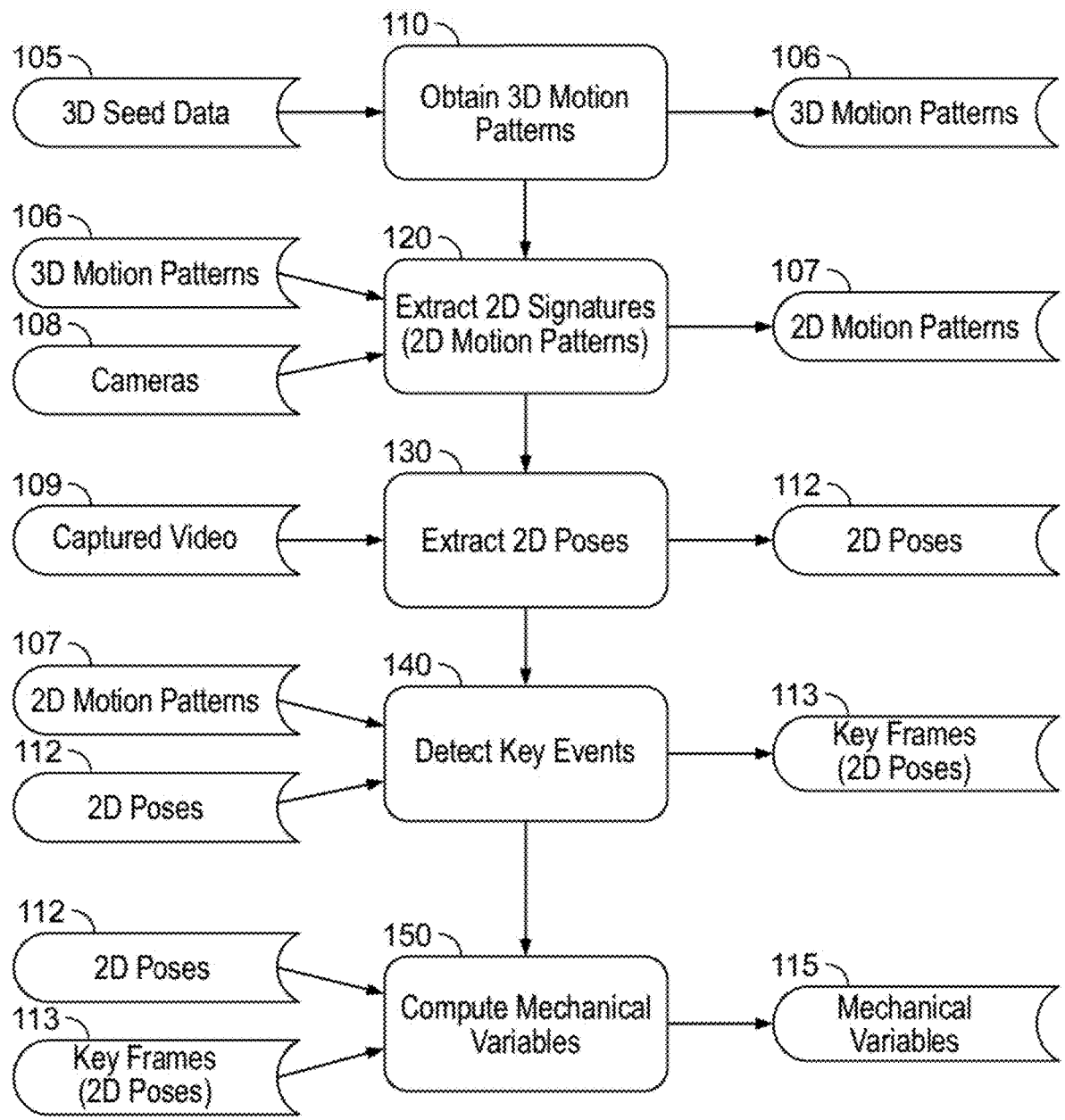
FIG. 1 shows an example process and data flow according to embodiments disclosed herein.

FIG. 1 shows an example process and data flow according to embodiments disclosed herein. At 110, three-dimensional (3D) motion patterns may be obtained from 3D seed data 105. The seed data 105 may include a library of motion capture data from real human movement corresponding to the motion to be analyzed. Alternatively or in addition, the seed data 105 may be automatically generated from such a library. For example, motion capture data may be taken from athletes that have performed the same motion repeatedly to generate a library of multiple views of the same basic motion. Alternatively or in addition, the seed data may be simulated or otherwise computer generated. For example, seed data may be created by generating avatars in a 3D-modeled environment and capturing motion of the avatar as it moves through a defined action, which may be simulated or may be generated from other real-world 3D data. From the seed data, 3D motion patterns 106 may be generated.

As a specific example, to analyze baseball pitches, a database of hundreds, thousands, tens of thousands, or any suitable number of captured or simulated pitches may be used, each represented by sequences of 3D poses covering different styles, pitch types and body shapes. The 3D pitches may be used to generate 2D pitch signatures as disclosed herein. A pitch signature is a two-dimensional (2D) projection of a pitch as seen by a virtual camera that faces the 3D pitch. That is, it provides a method to convert a series of 3D poses into a series of 2D poses. More generally, a "signature" as used herein refers to a projection of a particular movement or pose as seen from a defined perspective.

Figure 6A:
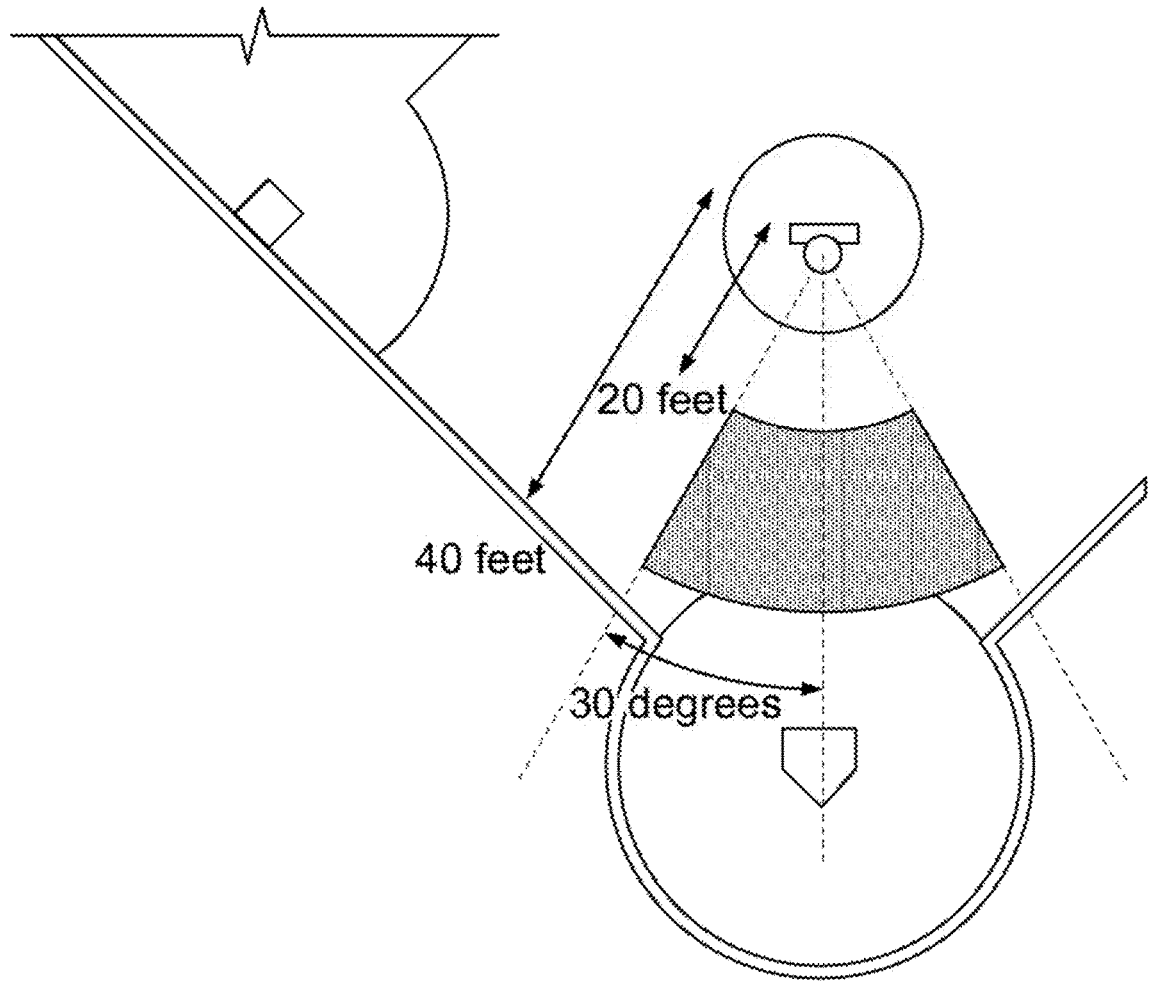
FIGS. 6A and 6B show front and side views, respectively, of an example arrangement of virtual camera placements according to embodiments disclosed herein.
Figure 6B:
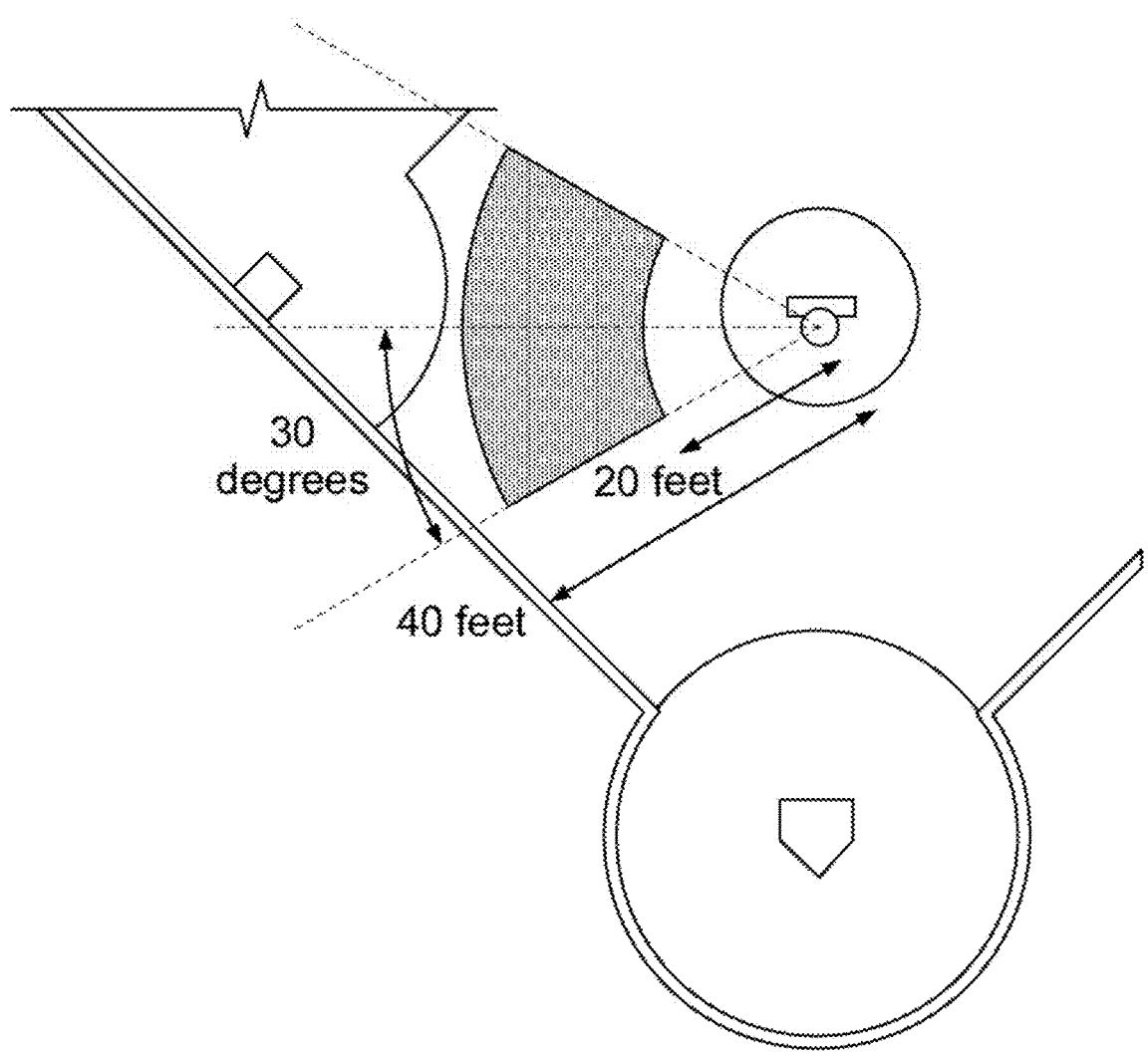

The system may generate one or more virtual cameras placed around the pitcher or other actor at 120. Examples of virtual camera placement are shown in FIGS. 6A and 6B, with front and side views shown, respectively. In some cases it may be desirable for the virtual cameras to primarily focus on the pitcher from a front view and from a side view. The 3D motion patterns 106 and data for one or more simulated camera views 108 may be used to extract 2D signatures as previously disclosed, i.e., 2D motion patterns 120, from the 3D motion patterns. The 2D signatures may correspond, for example, to poses taken by the person performing the action in the 3D motion patterns as seen from a particular point of view. The views in turn may correspond to one or more simulated camera locations. From these data, 2D motion patterns 107 may be generated.

Steps prior to 130 in FIG. 1 typically will be performed prior to analysis of an individual activity by a specific actor, such as analysis of a baseball pitcher's pitching form. For example, the 2D signatures may be extracted as previously disclosed and stored in a library of such signatures for further use by individuals. The library of signatures may be used in conjunction with analysis of performance of the same activity by any number of individuals.

Beginning at 130, a specific video of an individual performing the action may be used to analyze performance of the action by the specific individual. For example, a video of a tennis player's serve may be used to analyze the player's serve, such as to identify flaws or sub-optimal performance of the serve by the player. At 130, 2D poses may be extracted from a captured video 109. Notably, the video may be taken from an uncalibrated source. That is, the video may have been captured by a camera placed at an arbitrary distance and orientation relative to the person performing the motion that was captured. For example, an uncalibrated video of a baseball pitcher may have been captured from behind home plate (in front of the pitcher), to one side in the stands or on the field, or from any angle between the two and at any distance. The camera also does not need to be calibrated within the environment around the person or object being captured, and no special arrangements need to be made to the environment itself such as providing a particular background or style of background. Further, the input video footage may be captured, for example, from a phone, tablet, consumer-level digital camera, or the like, eliminating the need for a specific type or precision of camera.

In contrast, some conventional motion capture techniques require a calibrated video, which refers to a video taken from a specific distance and/or orientation relative to the motion being captured. As a specific example, a calibrated video system may require that a camera used to capture a baseball pitch is placed immediately behind the catcher in a standard major-league diamond, and may also require the camera to be placed at a precise height, with a predefined zoom, resolution, or other setting, or the like. An uncalibrated video source as disclosed and used herein has no such limitations. That is, an uncalibrated video source may be captured from essentially any location and orientation relative to the person or activity being captured, and no specific arrangement or placement of the camera needs to be defined prior to capture of the video. One or more 2D poses 112 may be extracted from the captured video 109, such as by using one or more pose estimator or equivalent algorithms as disclosed herein.

Figure 2:
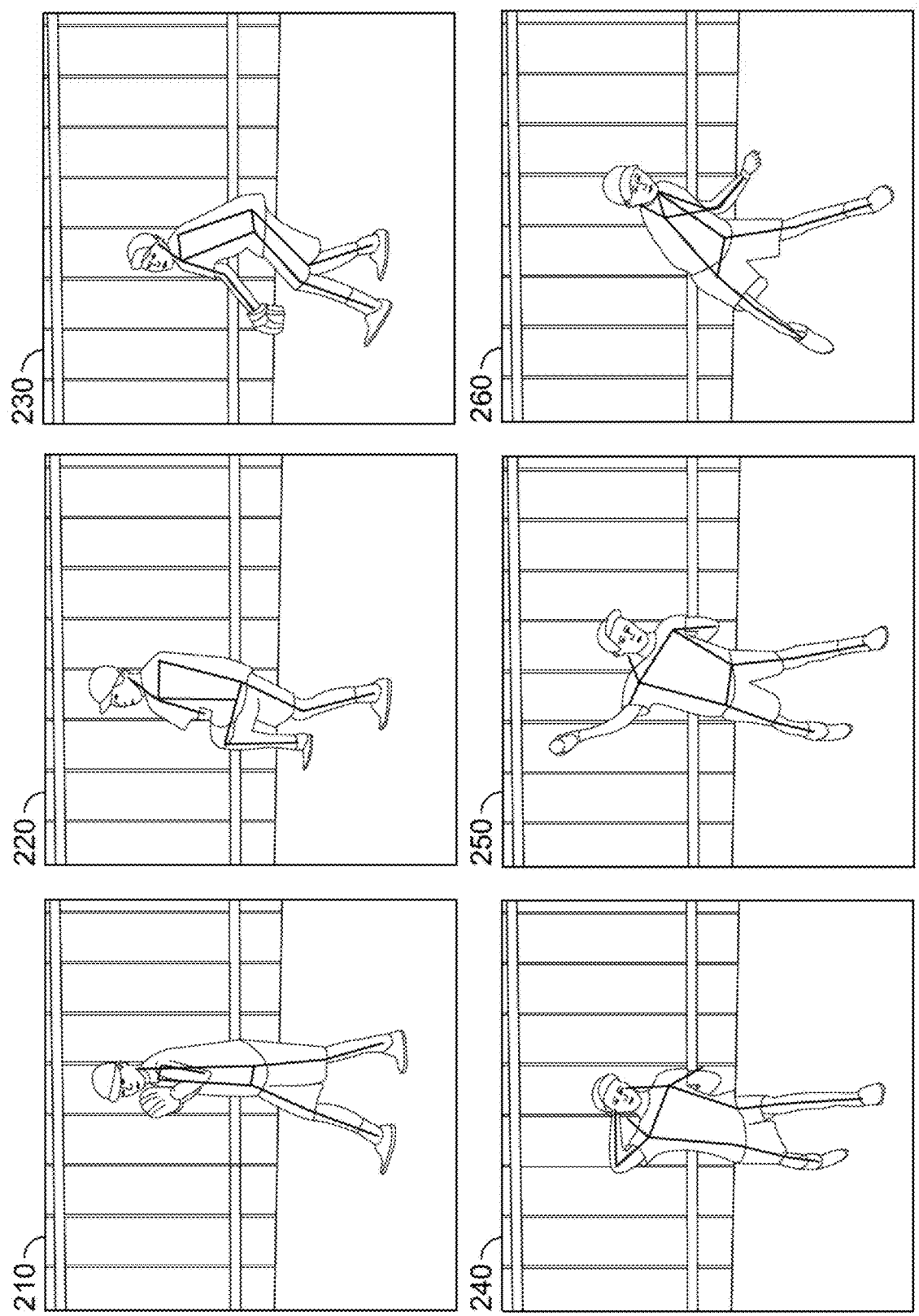
FIG. 2 shows an example series of 2D poses is a sequence of discrete-time data according to embodiments disclosed herein.

For example, the system may detect a series of 2D poses representing the movement of a pitcher on the video. The series of 2D poses is a sequence of discrete-time data, where one 2D pose is captured by one frame. An example of such a sequence is shown in FIG. 2. In some cases, a system as disclosed herein may automatically identify appropriate frames from a video to use for each pose in the series. For example, a system as disclosed herein may analyze one or more frames of video to identify a pose by identifying a closest match to a pose identified in the video, such as by matching joints, limbs, and/or other portions of a body in the video as described in further detail below. An example process for identifying poses is described in further detail with respect to FIGS. 5A-5B, below.

Figure 3:
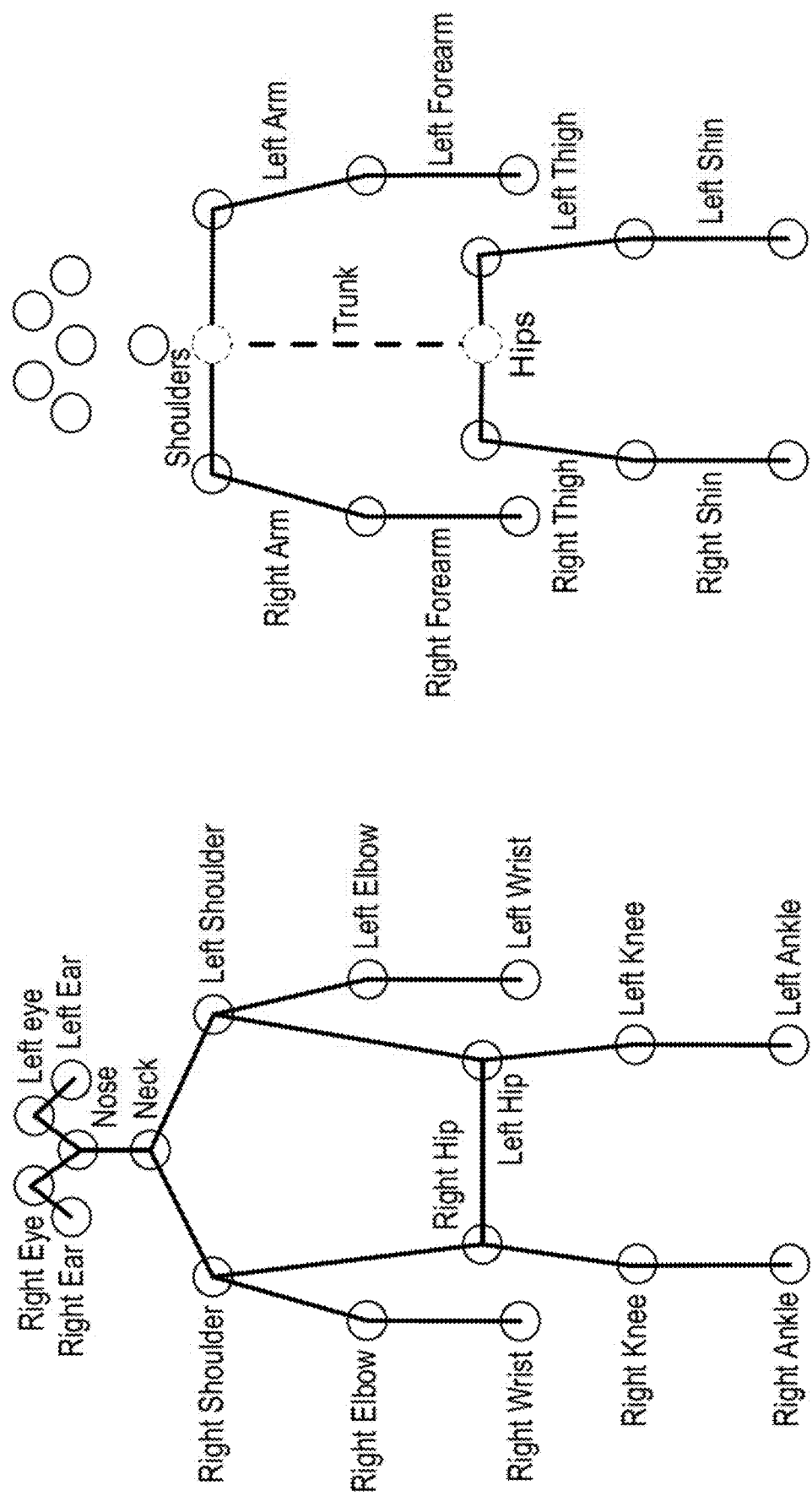
FIG. 3 shows examples of keypoints for a human body according to embodiments disclosed herein.

In an embodiment, the 2D poses may be captured by a pose estimator system or algorithm. Pose estimation generally refers to a computer vision analysis technique that infers or otherwise determines the pose of a person or object in an image or video. For example, a number of keypoints on a given object or person may be identified and located within the image or frames of a video, which may be tracked between frames of the video. Specific examples of keypoints are provided and described in further detail below, though as used herein more generally keypoints may be any repeatably-identifiable point, typically on a human body, that can be identified and tracked through a video, typically from frame to frame or in and between significant frames. In some embodiments, keypoints may represent joints such as elbows, knees, wrists, and the like, or they may represent other points of interest such as boundary points, interfaces between a human body and a piece of equipment, or the like. Examples of keypoints for a human body are shown in FIG. 3, but more or fewer points may be used, and different points may be used in some embodiments.

As a specific example, the poses shown in FIG. 2 may be identified based on the relative positioning of the keypoints located at vertices and/or connection points of the line segments shown, by comparison to the 2D poses as disclosed herein, such as to identify a closest or best match to known poses as disclosed herein. In this example, the selected frames may correspond to key events in a video of a baseball pitch, such as a front foot lift 210, max leg lift 220, foot strike 230, max hip and shoulder separation 240, shoulders squared up to target 250, and ball release 260.

A 2D pose estimation process 130 as disclosed herein may output the location of one or more keypoints in 2D space within one or more video frames. The series of 2D poses may encode the movement of the person in the video, but typically this provides a partial (two dimensional) view compared to a full 3D representation. For example, in the case of a baseball pitcher, the pitch and the critical movements performed by the pitcher during the delivery may be easily recognized in a series of 3D poses, but the ambiguity of the 2D projection may limit the ability to recognize any movement. Conventional 3D pose estimators typically fall short of the accuracy desirable for techniques disclosed herein due at least in part to this shortcoming. However, as described in further detail below, techniques and systems disclosed herein may overcome this shortcoming, for example using all or a portion of the process described in FIG. 1.

At 140, the 2D motion patterns 107 and the 2D poses 112 may be analyzed to detect key events in the video and the 2D motion patterns. For example, when analyzing a golf swing the key poses may correspond to the peak of the swing between the backswing and the downswing, the moment of impact, the initial follow-through, the final position, or the like. Key frames 113 from the video that correspond to the identified key poses may be identified and isolated, such as for further human or automated review.

Figure 5A:
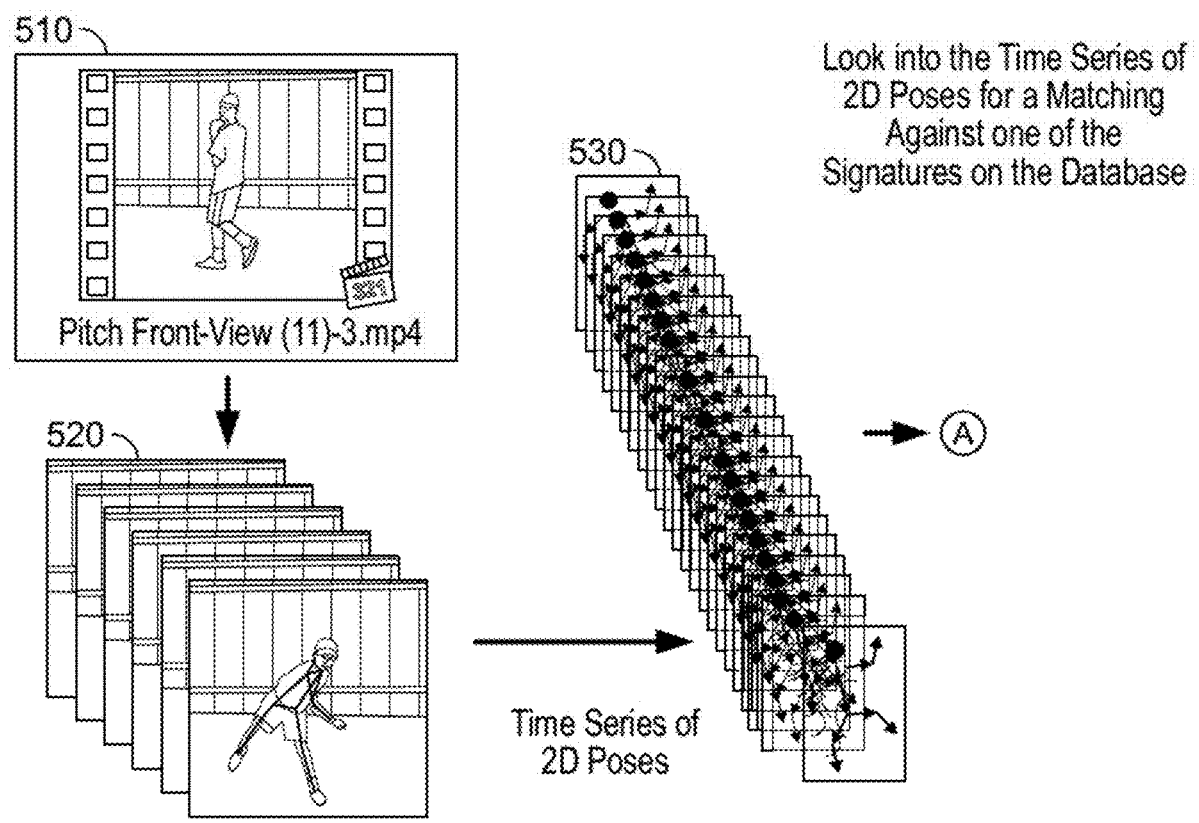
FIGS. 5A-5B show an example of comparing 2D poses extracted from a video to signatures of the associated action according to embodiments disclosed herein.
Figure 5B:
Figure 5B:
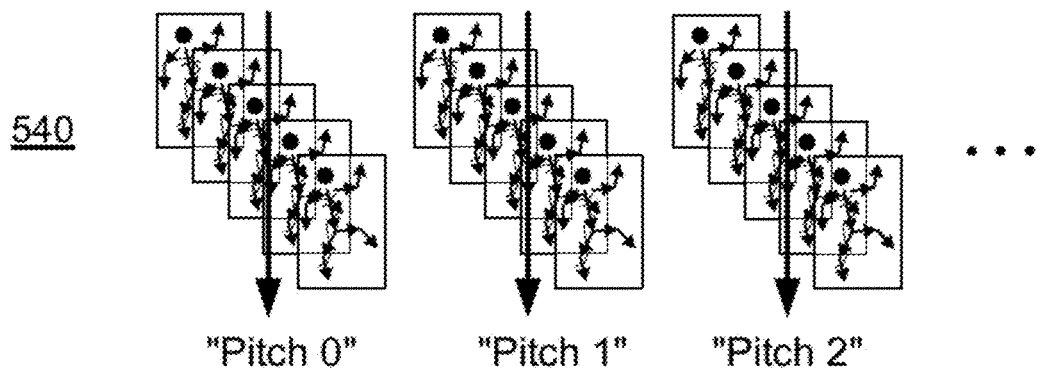
Figure 5B:
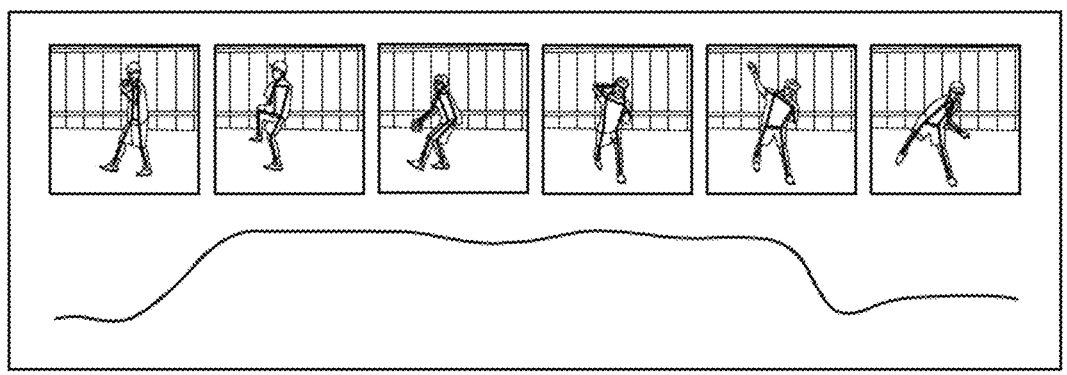

In an embodiment, the 2D poses extracted from the video may be compared against signatures of the action. FIGS. 5A-5B show an example of such a process using a baseball pitch. In this example, the goal is to identify a set of 2D poses that correspond to the pitch in the video, such as from the maximum leg lift to the ball release.

Figure 4:
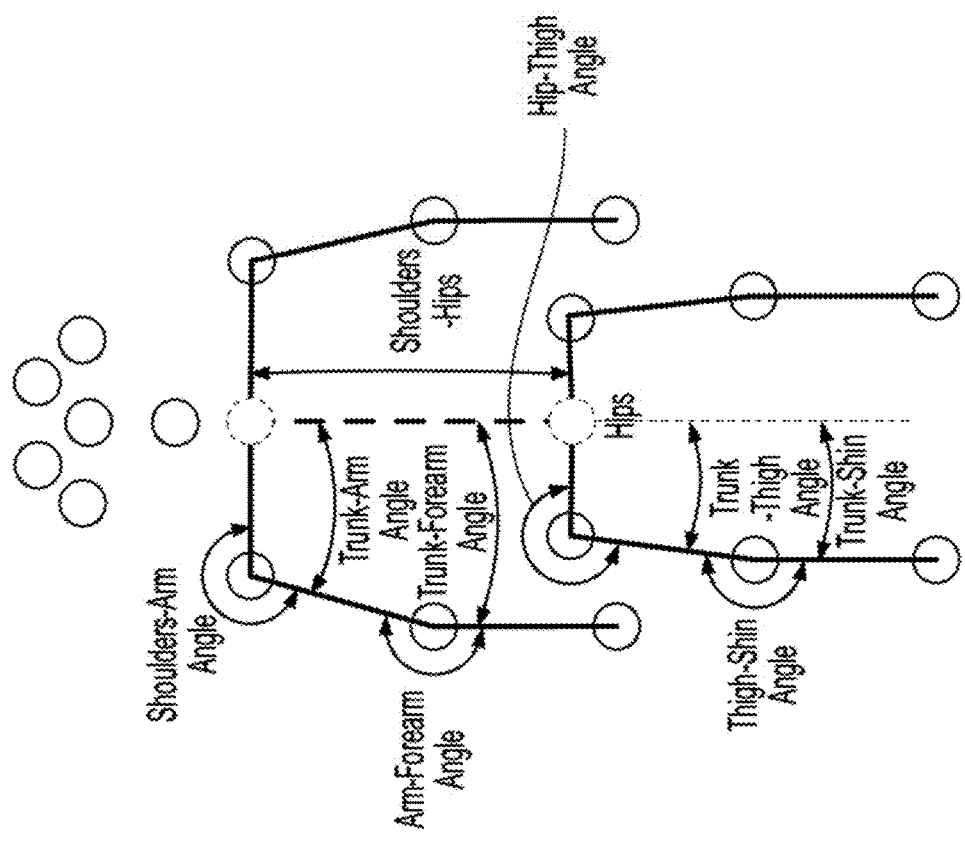
FIG. 4 shows an example of poses from 2D coordinates converted to angles between segments of a representation of a human body according to embodiments disclosed herein.
Figure 4:
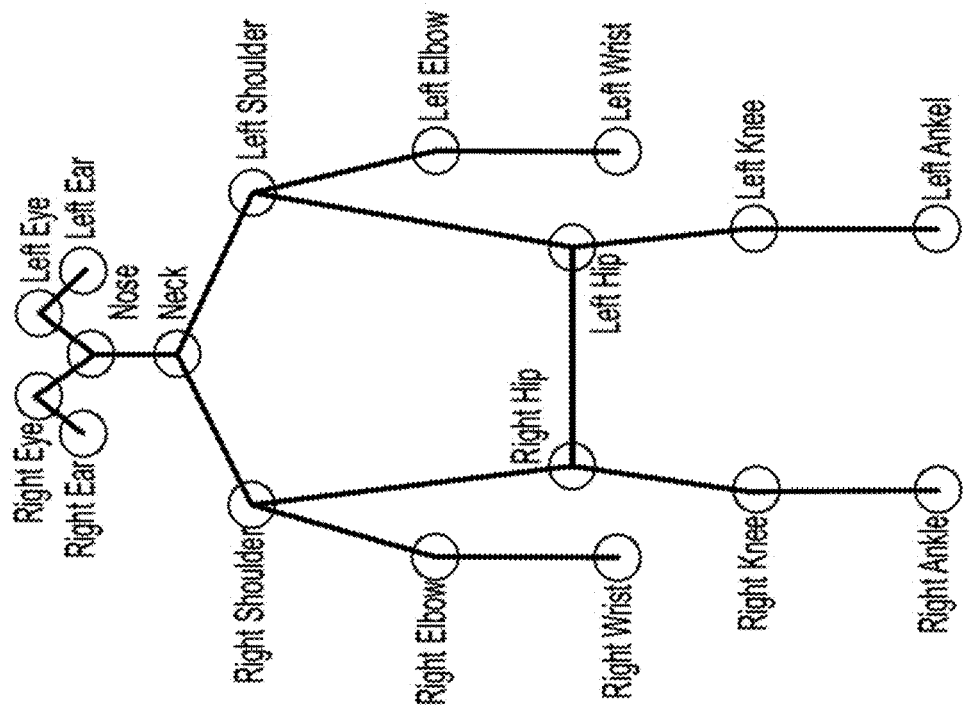

In an embodiment, matching between two series of 2D poses may be computed directly in the 2D domain, for example by comparing the coordinates of the keypoints. However, such calculation may be subject to the position, orientation and size of the subject performing the action (translation, rotation and scale, respectively). That is, the same pitch, when performed in two different positions in the frame, may result in two distinct sets of 2D coordinates. These sets may appear to be different pitches, since each keypoint would move over different trajectories in the 2D domain, even while being instances of the same pitch. To address this, in some embodiments the system may convert the representation of poses from 2D coordinates for each keypoint to angles between the segments of the pitcher's body, for example as shown in FIG. 4. The matching between two 2D poses is then compared as the difference between their internal angles of their segments, instead of their 2D coordinates. Angles between the segments of the body are commonly used to represent poses on the study of biomechanics, since they remain constant under rigid transforms in 3D space, that is, remain constant for similar actions regardless the position, orientation or the size of the subject that perform them. Since embodiments disclosed herein derive a library of 2D poses from 3D motion patterns, the library may include sufficient "perspective" views of the 2D poses to allow for matching based on such angles, even though they may vary from one 2D pose to another that have been derived from a common 2D motion pattern.

To identify key events, the series of 2D poses 112 corresponding to the pitch are used to search the key events of the pitch. Key events are significant temporal events on the movement of the pitcher, which may be used to break down the whole movement into parts that may be studied independently or in association to each other.

For example, key events in a baseball pitch may include the front foot lift (which typically indicates when a pitch is considered to "begin," i.e., it is the "clock starter" for a system or user that is timing the pitch), max leg lift, foot strike, max hip and shoulder separation, shoulders squared up to target, and/or ball release. For other actions, in other contexts, or when specific other analysis events are desired, different key events may be used. In the same way as the search for the series of 2D poses in the video that correspond to the pitch, the search for the 2D poses that correspond to each key event is based on the signatures of these events as extracted from the database of 3D poses of pitches as previously disclosed. The detection of the pitch may limit the range of 2D poses that will be considered for each event.

FIG. 5 shows an example process for identifying poses and key events as disclosed herein. At 510, a video may be received from a user, which may contain one or more video segments showing an activity of interest, such as a single baseball pitch. At 520, individual frames may be identified within one of the video segments which correspond to key frames of the video segment as previously disclosed and one or more poses of a human player in the segment may be identified. At 530 the identified poses may be compared to pose signatures within the database as previously disclosed. As shown at 540, if a video includes multiple actions, such as multiple pitches, each may be analyzed separately, and each pose in the action may be compared separately to poses in the database. At 550, the system may determine a degree of match ("matching probability") between one or more of the key frames and a pose in the database of signature pitches. For example, to determine a match between an extracted 2D pose from the frame, and another 2D pose generated from the 3D database of signature pitches as previously disclosed (which may be generated from the 3D signature pitches using a variety of virtual camera positions), the weighted distance between keypoints positions may be calculated for each extracted pose and the corresponding keypoints from the 2D generated pose. Depending on the event being considered, different weights may be applied to different keypoints, and different forms of calculating the distance between keypoints may be used, such as the Euclidian distance between the points. The weights and calculation techniques may be selected based upon the captured action since different keypoints may be physically more significant in some actions than in others. For example, the motion of a golfer's upper body in a golf swing, including shoulders, arms, and torso position may be more relevant than the knee position relative to the hips. The smallest total distance between two poses indicates a high probability of matching. In the illustrative example shown, the center four poses have a higher match than the first and last.

Referring again to FIG. 1, at 150, the 2D poses 112 and key frames 113 may be further processed to compute one or more associated mechanical variables 115. Continuing the example of a baseball pitch, mechanical angles such as first forward movement, energy angle, stride, head drop angle, delivery time, distance-from-axis (for throwing arm or glove arm), hip-shoulder separation, and the like may be calculated. For other actions, any other similar mechanical variable may be computed from the 2D poses and key frames.

The mechanical variables may be used by human or automated players, coaches, advisors, trainers, or other individuals to analyze and improve the actions performed by the initial actor captured in the video 109. Thus, embodiments disclosed herein may allow for identification and correction of mechanical issues on the movement of an athlete such as a baseball pitcher.

Once issues, if any, have been identified, the system may suggest drills that may help the pitcher have a more effective, efficient, or otherwise improved pitching motion. For example, the system may suggest drills that will teach the pitcher to effectively transfer muscular force from one body segment to another, thus improving this throwing speed. Such suggestions may be made automatically by a computerized system as disclosed herein without requiring intervening human action or interpretation. Alternatively or in addition, the data and suggestions generated by the system may be used by a human operator to further improve training or other activities. For example, a pitching coach or automated pitching system may use the key frames and computed mechanical variables to show a pitcher an improved technique for delivering the same type of pitch that was captured in the video. Even where a coach or other human instructor is involved, the data provided by the system will be much more accurate and thorough than any human could achieve unaided. For example, a pitch may take place over such a small time that a human cannot reasonably view and analyze all the motions and keypoints in the pitcher's stance and movement sufficiently quickly to suggest specific drills or exercises that will improve specific aspects of the pitcher's performance, even immediately after the pitch is thrown. More generally, the types of motion considered by the embodiments disclosed herein will occur over such small time frames that the human eye and brain cannot reasonably track them with sufficient precision to achieve the same efficiency and accuracy of data, recommendations, and results as disclosed herein.

In some embodiments, it may be desirable to use a segmentation process to identify individual actions within a longer video and provide shorter clips, each clip including one action. For example, it may be desirable to segment a video that contains multiple pitches thrown in sequence into a series of clips that each show a single pitch. This approach may address the tendency of multiple-pitch videos to contain significant amounts of extraneous time where no pitch is occurring, time which is considered irrelevant in context of the proceeding analysis engine. More generally, the segmentation engine may be used to identify the specific motions of interest in a given context, while ignoring or discarding irrelevant portions of a longer video.

There may be several advantages to incorporating a segmentation process. First, the processing time of the analysis process as previously disclosed may be significantly reduced. In many cases, this time can be reduced by a factor of 5 or more, which additionally correlates with reduced computing and storage requirements, including data transfers to/from cloud computing resources and the like. Second, the accuracy of the proceeding analysis engine may be greatly increased, as the potential for false positives in the input data is reduced as irrelevant video material is essentially removed. Third, the approach allows for the potential of a significant storage requirement reduction, where only short segments of an input video can be stored; the greatest benefits of this likely being seen in the form of reduced cloud storage requirements or local device storage requirements. As another example, the utilization of the module in context of video submissions to the app represents a degree of convenience for the user, enabling him/her to submit running video as opposed to manually-segmented clips. For example, where a coach wants to capture and analyze video of a player performing the same motion, drill, or the like repeatedly, the coach can simply take a longer video of the player performing that action multiple times in a row and allow the system to automatically identify each individual action. In contrast, conventional techniques including human-centered coaching techniques typically require each individual action to be recorded and/or analyzed individually.

When a segmentation process is used in conjunction with the analysis processes previously disclosed herein, a human coach or an "automated coach" implemented by a computer system as disclosed herein also may quickly obtain useful data on an individual using an uncalibrated video of the individual performing an action, such as a baseball pitch, repeatedly. For example, a baseball coach may quickly receive a number of "report cards" or similar reports that provide the mechanical variables typically used to evaluate a pitch, after providing only an uncalibrated video that includes multiple pitches thrown by the individual. In some embodiments, the report may be provided in real-time or essentially real-time, such as where a coach uses a phone, tablet, or other portable device to capture the uncalibrated video, and software operating on the device performs the processes disclosed herein to calculate and present information derived from the captured video. As used herein, a process is performed in "real-time" if it happens with no delay or no appreciable delay other than the delay inherent in providing data from one component to another. That is, "real-time" processing of video may appear to the user to be completed with no appreciable delay after capture of the video, or with no delay other than that necessary to move from the interface used to capture video on the device to an interface that presents results of analyzing the video. In some embodiments, the time between ending capture of a video including one or more actions (such as individual baseball pitch motions) and presentation of the results to the user may be 1-5 seconds or less.

Figure 7A:
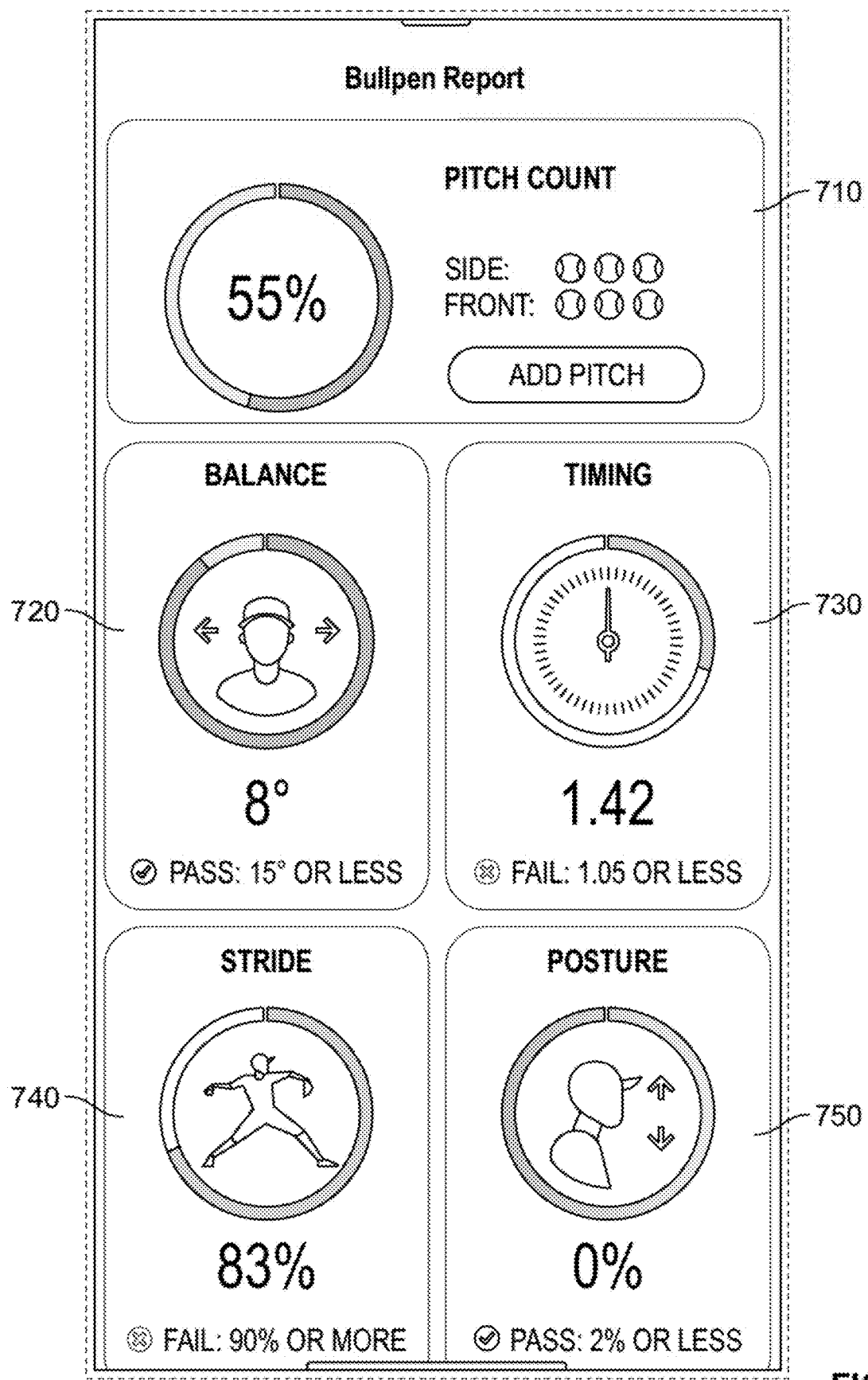

An example of an interface to display data related to performance of an action based upon an analysis as disclosed herein is shown in FIGS. 7A-7D. Generally, information may be derived from one or more keypoints, poses, mechanical variables, and combinations thereof as disclosed herein. The information may include statistics related to multiple performances of the same action, data about a single performance of the action, an indication of one or more components or portions of the action that was performed sub-optimally, information about how to improve performance of the action, and the like, or any combinations thereof. In the example shown in FIG. 7A, a number of pitches by the same pitcher have been captured and analyzed. Examples of general statistics 710 that may be calculated and displayed include the number of pitches thrown, the number captured from various angles (font, side, the like), the number of pitches meeting a certain criteria, and the like. As previously disclosed, mechanical variables calculated based upon the captured uncalibrated video and poses extracted therefrom also may be used to evaluate components of the action (in this case a baseball pitch) and identify the components where the actor is or is not within a desired range. In the example of FIG. 7A, these components include balance 720, timing 730, stride 740, and posture 750, but more generally any component that may be derived from poses and/or mechanical variables may be used. Such components typically correspond to, or may be directly derived from, the mechanical variables disclosed herein. For example, the "timing" component in this example may be calculated as the elapsed time from one pose corresponding to the maximum leg lift or the front foot lift, to another pose corresponding to the ball release. Such components and corresponding mechanical variables may be defined based upon known motion that falls within the desired thresholds, such as the library of 3D motion patterns disclosed herein.

The interface may indicate whether each component meets a desired threshold or other criteria. As shown, this may be presented as a numerical value, percentage, pass/fail rating, or any other format. As a specific example, FIG. 7A shows that, for this set of pitches, the pitcher had a "balance" rating 720 of 8%, which is below a desired threshold of 15%; accordingly, the "balance" component is given a "pass" rating. A different component, "timing," 730 refers to the total time from beginning to end of the pitch, averaged over the pitches being analyzed. In this case, the average time was 1.42 seconds, which is above the desired threshold of 1.05 seconds so the component is given a "fail" rating.

Notably, as previously disclosed, the component analysis and information represented in FIG. 7A could not reasonably be computed or otherwise determined by a human. For example, a human observer likely would not be able to distinguish the difference between the timing of multiple pitches with sufficient accuracy to determine that the average was 1.42 seconds, due to the inherent limitations on reaction time for the human observer to start and stop any sufficiently-accurate timing mechanism.

Figure 7B:
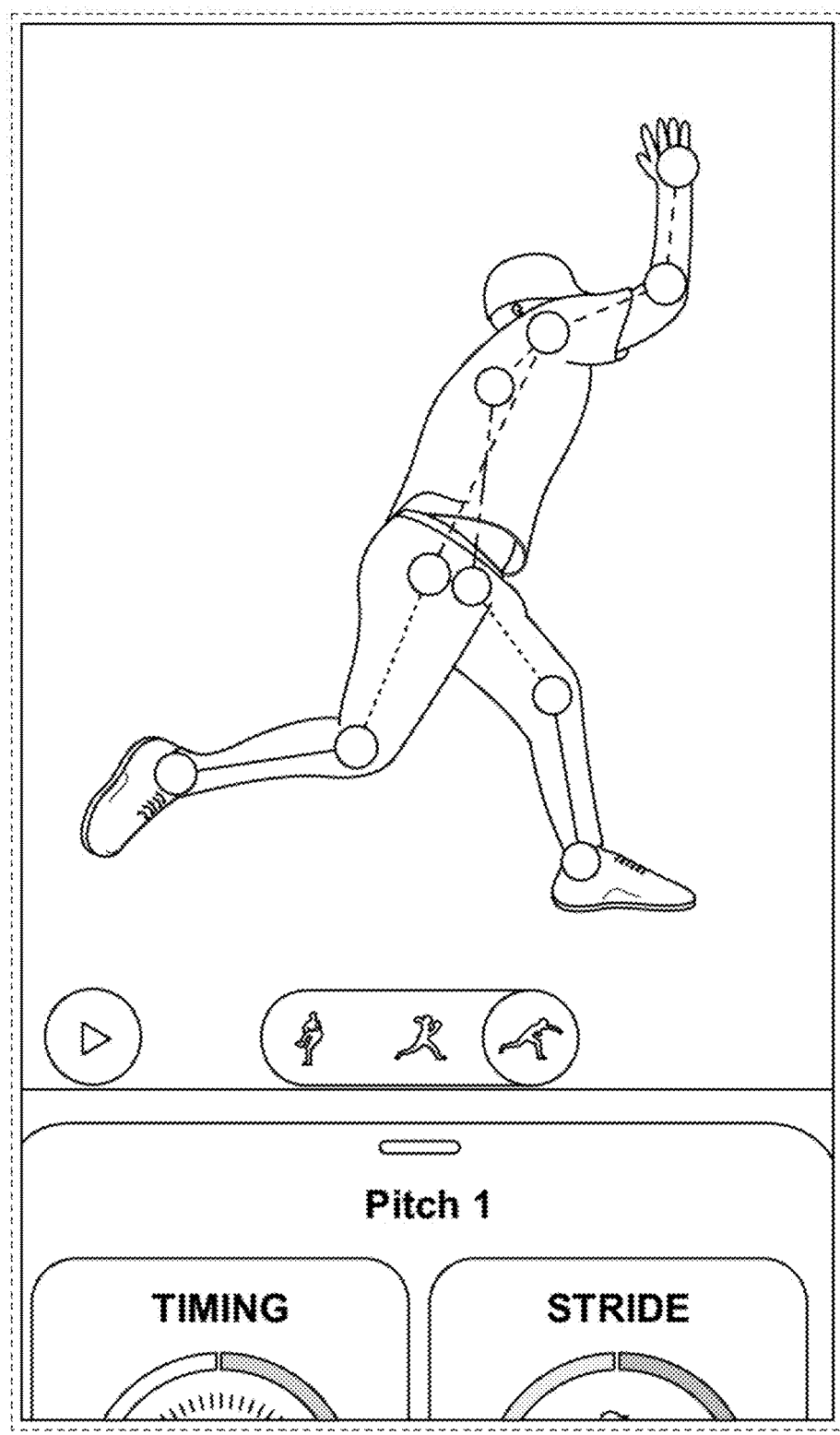

The interface may provide other information associated with the report. For example, the "stick figure" representation of an associated pose may be shown as an overlay on one or more frames of a video segment, as shown in FIG. 7B. Such a video and overlay may be shown in conjunction with the other information shown in FIG. 7A, or may be displayed in response to a user action such as a selection of a video segment, video frame, or a portion of the other information. A similar overlay may be used for other purposes within the interface. For example, the overlay may be displayed on a still image or video of a professional baseball pitcher or a similar wireframe "stick figure" generated for the professional pitch form, in order to provide a visual comparison of the individual's performance in comparison to the professional pitcher.

Figure 7C:
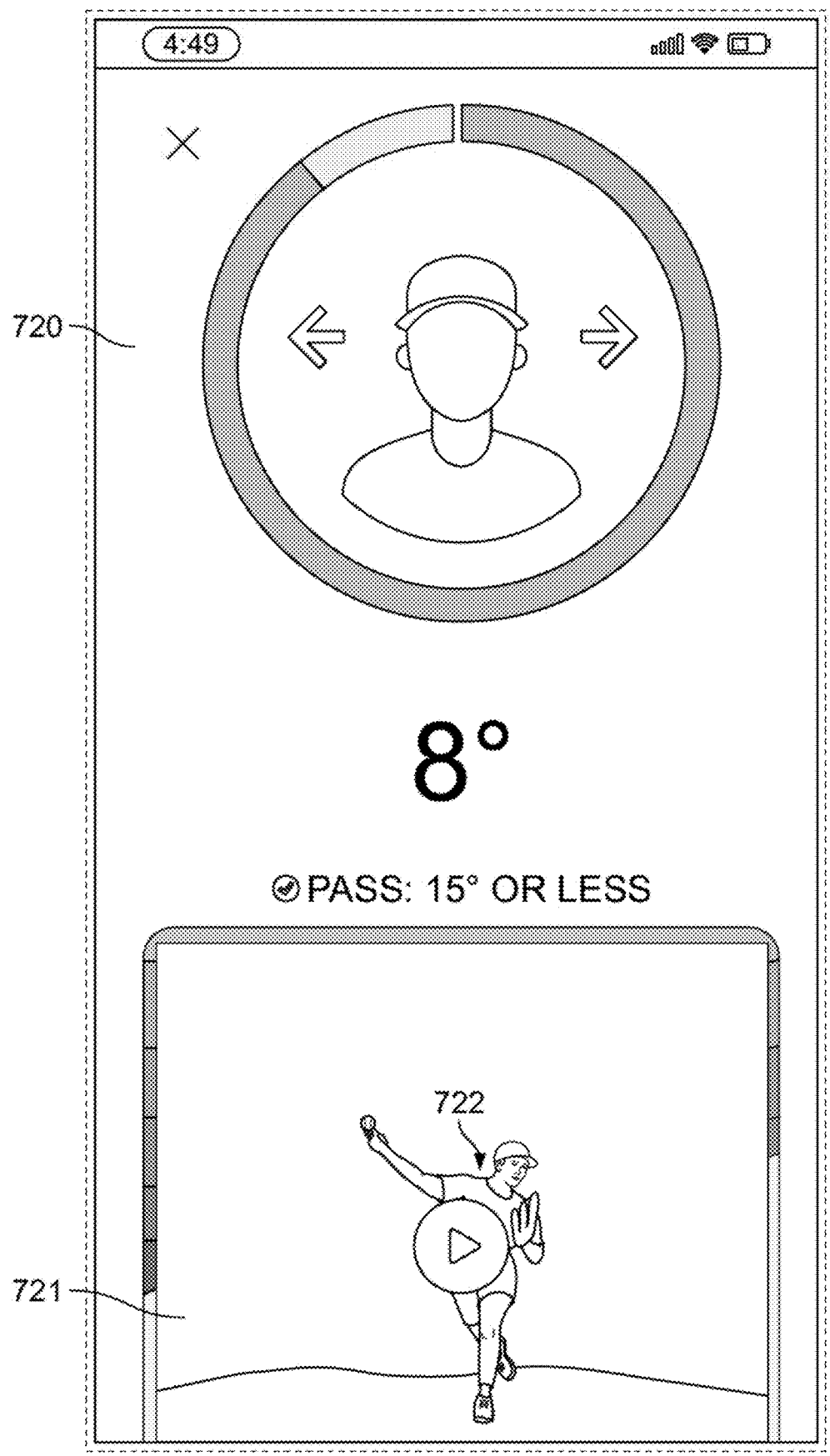

The interface may provide additional information related to one or more of the components, such as to show the user an example of why the component is or is not within the desired threshold, and/or to provide automatic suggestion of a drill, exercise, or similar activity that can be performed to improve that component. An example of a first portion of such an interface is shown in FIG. 7C. In this example, the user selected the "balance" component 720 from FIG. 7A, such as by tapping on the "balance" analysis 720 in a mobile interface. The interface also shows a video segment 721 with an indication of the mechanical variable 722 that led to a below-threshold balance calculation. In this example, the mechanical variable 722 is shown as a line angled relative to a vertical line on the pitcher's body, indicating the degree of balance based on one or more angular relationships between segments drawn between identified keypoints as previously disclosed.

FIG. 7D shows a second portion of the interface of FIG. 7C, for example, when the user has scrolled down the interface on a mobile device. In this example, the interface also provides a general description of the "balance" component and its importance to a successful baseball pitch at 770. The interface also automatically recommends drills at 780 that may be used by the pitcher to improve this component of his pitch form.

More generally, systems and processes as disclosed herein may automatically identify one or more components of an action that were performed sub-optimally by the human actor. As used herein, a component of an action analyzed by the system is considered "sub-optimal" if it falls outside a desired range, threshold, or similar criteria, either during an individual performance of the action or in aggregate for multiple performances of the action being considered by the system.

As previously disclosed, in some cases it may be desirable to use a segmentation process to split a longer video into multiple smaller videos. A segmentation process as disclosed herein may run on any frame rate of input clip, including slow-motion videos. In addition, the algorithm can detect pitches for any length of clip from any camera view, as long as the videos are of reasonable quality. 'Reasonable' quality, in this respect, refers to the ability of the implemented pose estimator to detect people/joint coordinates in the frame. In this sense, the process may be able to output if sufficient video quality isn't being met.

Various parameters may be used to determine segmentation points. For example, a stride parameter may be used to determine how many frames are analyzed. In this example, a stride of 3 would indicate that the system analyzes every third frame in the video. Other parameters may be used to analyze specific actions. Continuing the example of a video that include baseball pitches thrown in sequence, parameters may include items such as how many seconds before and/or after a pitch signal to record, how many consecutive frames outputting a positive pitch signal to use to indicate a pitch is occurring, or the like.

A segmentation process as disclosed herein my output a collection of clips, each including a single action as previously disclosed. In addition, additional signals may be identified and provides as part of the segmentation process. For example, signals such as "invalid pose" (indicating the pose results are distorted), "catcher detected", "person detected outside screen", "no person detected", "knee above hip detected", "opposite ankle above knee detected", or other informative signals may be provided.

These signals may be used to identify the motion of a pitch. For example, an embodiment may use two different pitch signals: a 'Knee above Hip' check and 'Ankle above Knee' Check, as described below. Each signal may be designed to uniquely identify the motion of a pitch, while having the ability to avoid falsely labelling non-pitch motions in the frame as pitches. Extra people in a respective frame can include batters, catchers, umpires, infield players, and fans in the stands. Reasons for having detections for both pitch signals include the ability to catch pitches that get overlooked by one, but not both, of the signals. For example, if a pitcher's particular delivery doesn't involve lifting his/her knee above a hip, ideally the 'Ankle above Knee' check would output positive. Additionally, a pose estimator as previously disclosed may occasionally have faults in the detected joint locations. Two or more signals may be implemented to be robust to left/right mix-ups and other common joint detection inaccuracies that may be observed or expected for a particular pose estimator or for pose estimator algorithms in general.

Initially, various pre-processing techniques may be used to orient and arrange the video for segmentation. For example, video metadata may be analyzed to determine if the video was taken in portrait or landscape mode and the system may rotate the video as needed. The video also may be resized to account for zoom and/or distance and to homogenize videos to a common initial width or other dimension. For example, a video or series of videos may be resized so that the height or width remains constant, so that a common individual or other repeated object in the videos has the same maximum dimensions, or the like.

An example segmentation process may include the following:

1. People Detection: Detects all people in the image, gets bounding box coordinates of each person detected. For example, any suitable technique may be used to identify one or more persons in the video, after which a bounding box may be defined the encompasses the identified figure. The bounding box may be, for example, the smallest box that can be drawn around the person, or it may include an additional amount of padding to allow for uncertainty due to video resolution or the like.

2. Primary Person Focus: A selected number of identified persons with the highest area bounding boxes may be identified. In some embodiments, four or fewer may be selected. Where fewer than the maximum number exist in the frame or video, all bounding boxes may be retained.

3. Keypoint Detection: The joint coordinates of the selected people are detected using a pose estimator as disclosed herein.

Figure 8:
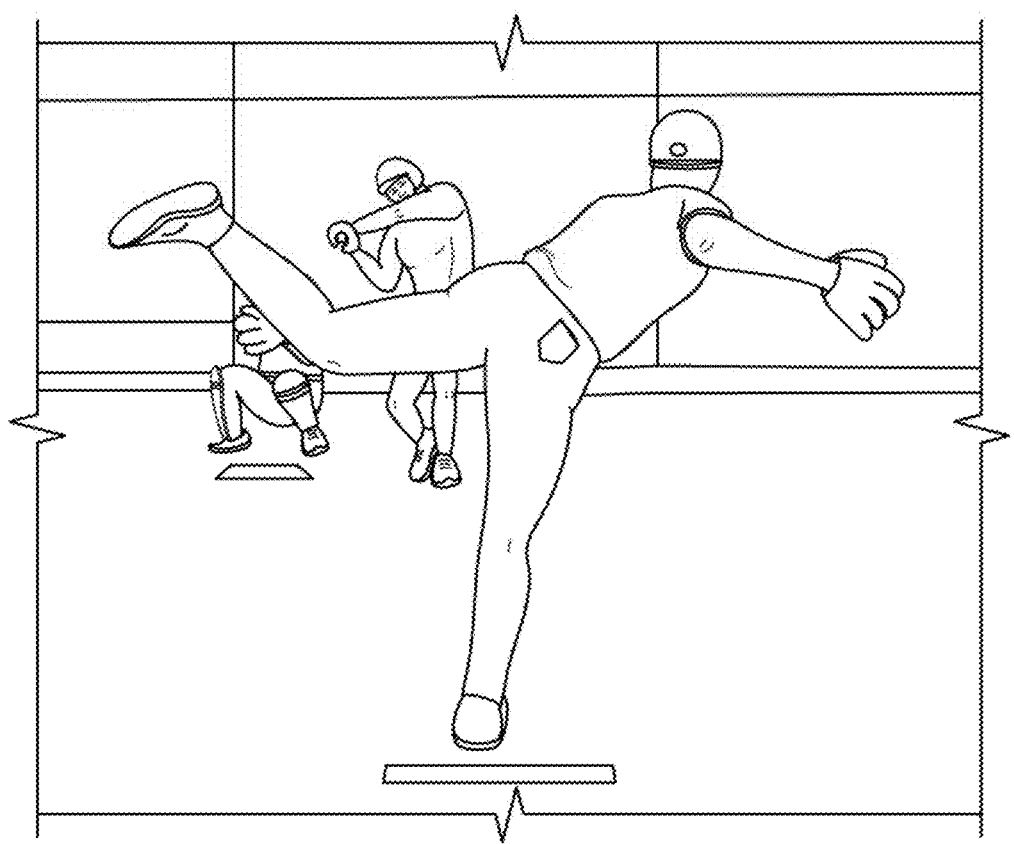
FIG. 8 shows an example of a pose that will result in a positive signal according to embodiments disclosed herein related to identifying pitching poses.

4. For each person detected, the following analysis may be performed:

a. Person in Screen Check: Makes sure key pitch-related joints are not on edges of screen, such as the ankles, knees, and hips. This may address the tendency of a pose estimator algorithm to output joint coordinates on edges of image if they aren't in the image. If the check fails, the process may omit the associated person as a candidate for being in the process of throwing a pitch.

b. Catcher Detect: This process determines if the respective person is a catcher by examining whether the figure is in a catcher's pose. If one or more of below catcher conditions are met, the person may be passed on as candidate for being in process of throwing a pitch. Alternatively or in addition, a catcher may be detected by comparing an individual in the captured video to one or more patterns of a known catcher position, such as by comparison to a library of poses as previously disclosed. Examples of signals for detecting a catcher may include:
  i. If (angle between right hip, right knee, right ankle is <105 degrees) and (angle between left hip, left knee, left ankle is <105 degrees)
  ii. If rear joint y-coordinate is below right knee y-coordinate and below left knee y-coordinate
  iii. If right wrist y-coordinate is below right knee y-coordinate and below left knee y-coordinate
  iv. If left wrist y-coordinate is below right knee y-coordinate and below left knee y-coordinate c. Ankle above Knee Check (First Pitch Signal): An example of a pose that will result in a positive "Ankle above Knee" signal is shown in FIG. 8. Various conditions may be used to detect a pitch. For example, two condition sets that can be satisfied to indicate a positive pitch signal are:
  i. If left ankle y-coordinate is above right knee y-coordinate or above left knee y-coordinate
    right ankle y-coordinate is not also above right knee y-coordinate or above left knee y-coordinate
    (left wrist y-coordinate below left hip y-coordinate and left wrist y-coordinate below right hip y-coordinate) or (right wrist y-coordinate below left hip y-coordinate and right wrist y-coordinate below right hip y-coordinate)
    (right knee y-coordinate does not equal left knee y-coordinate) and (left hip y-coordinate does not equal right hip y-coordinate) and (left ankle y-coordinate does not equal right ankle y-coordinate) and (left ankle x-coordinate does not equal right ankle x-coordinate). This may address potential faults of a pose estimator. In some cases, the estimator may default to right/left joints being detected in the same position (falsely).
    (left ankle x-coordinate being at least 5 pixels distance from left knee x-coordinate) and (left ankle y-coordinate being at least 5 pixels distance from left knee y-coordinate) and (right ankle y-coordinate being at least 10 pixels distance from right knee y-coordinate). This also may address shortcomings of a pose estimator.
    the angle between left ankle, right ankle, and vertical axis from right ankle is less than 60 degrees
    the Euclidean distance from left knee to left ankle is less than the Euclidean distance from left ankle to right knee
  ii. If right ankle y-coordinate is above right knee y-coordinate or above left knee y-coordinate
    left ankle y-coordinate is not also above right knee y-coordinate or above left knee y-coordinate
    (left wrist y-coordinate below left hip y-coordinate and left wrist y-coordinate below right hip y-coordinate) or (right wrist y-coordinate below left hip y-coordinate and right wrist y-coordinate below right hip y-coordinate)
    (right knee y-coordinate does not equal left knee y-coordinate) and (left hip y-coordinate does not equal right hip y-coordinate) and (left ankle y-coordinate does not equal right ankle y-coordinate) and (left ankle x-coordinate does not equal right ankle x-coordinate)
    (right ankle x-coordinate being at least 5 pixels distance from right knee x-coordinate) and (right ankle y-coordinate being at least 5 pixels distance from right knee y-coordinate) and (left ankle y-coordinate being at least 10 pixels distance from left knee y-coordinate)
    the angle between right ankle, left ankle, and vertical axis from left ankle is less than 60 degrees
    the Euclidean distance from right knee to right ankle is less than the Euclidean distance from right ankle to left knee If all the conditions of (i) or (ii) are met, a pitch may be labeled as detected and a clip may be provided as previously disclosed. Alternatively or in addition, the pose validity may be verified by comparing the result of the matching process against known pose patterns. That is, data extracted from the 3D pose database may be used not only to detect key events, but also to evaluate the results of a pose estimator as well. This holds for any detected poses or combinations of poses disclosed herein which are represented in the associated 3D pose database and/or extracted 2D poses.

d. Pose Validity Check: This type of check may be used to determine if certain basic joint coordinate relationship requirements are satisfied for a pose. For example, most valid pose estimator results will result in the following relationships being true:
  i. (left shoulder y-coordinate above left hip y-coordinate) and (left shoulder y-coordinate above right hip y-coordinate)
  ii. (right shoulder y-coordinate above left hip y-coordinate) and (right shoulder y-coordinate above right hip y-coordinate)
  iii. (right hip y-coordinate above right ankle y-coordinate) and (right hip y-coordinate above left ankle y-coordinate)
  iv. (left hip y-coordinate above left ankle y-coordinate) and (left hip y-coordinate above right ankle y-coordinate)
  v. (rear y-coordinate above right ankle y-coordinate) and (rear y-coordinate above left ankle y-coordinate)
  vi. (right elbow y-coordinate above left hip y-coordinate) and (right elbow y-coordinate above right hip y-coordinate)
  vii. (left elbow y-coordinate above left hip y-coordinate) and (left elbow y-coordinate above right hip y-coordinate)
  viii. (right wrist y-coordinate above left hip y-coordinate) and (right wrist y-coordinate above right hip y-coordinate)
  ix. (left wrist y-coordinate above left hip y-coordinate) and (left wrist y-coordinate above right hip y-coordinate)

Figure 9:
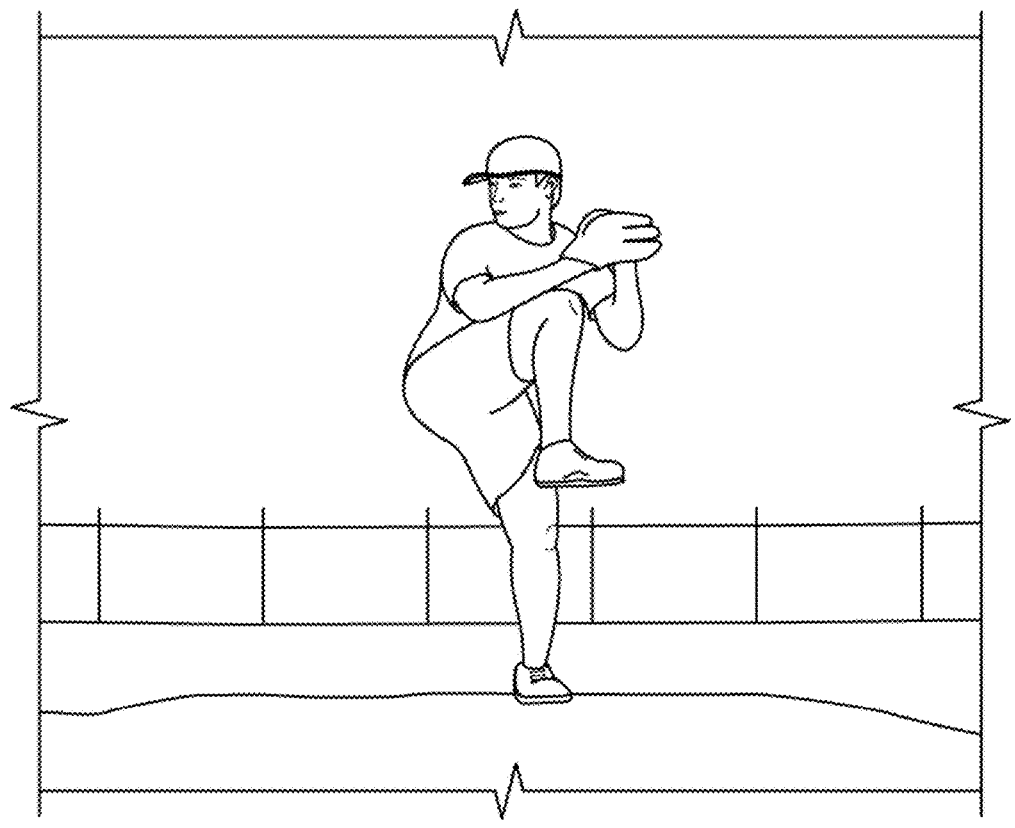
FIG. 9 shows an example of a pose that will result in a positive signal according to embodiments disclosed herein related to identifying pitching poses.

In some embodiments, a pose validity check may be performed after other pose signal analysis because in other circumstances the pose may be invalid. Continuing the present example, the pose validity check may be performed after the Ankle above Knee check in (c) because in any other circumstance, that pose should be considered invalid.

e. Knee above Hip Check (2nd Pitch Signal): FIG. 9 shows an example pose that includes a positive 'Knee above Hip' signal. Continuing the same example, this check may be used to determine if a person's knee y-coordinate (left or right) is above one/both hip y-coordinates. For example, there may be two possible condition sets that can be satisfied to indicate positive pitch signal:
  i. Left Knee y-coordinate above right hip y-coordinate or above left hip y-coordinate
   Catcher not detected (see (b) above)
   (right ankle y-coordinate does not equal left ankle y-coordinate) and (right knee y-coordinate does not equal left knee y-coordinate) and (right hip y-coordinate does not equal left hip y-coordinate)
   (right knee x-coordinate is at least 5 pixels distance away from left knee x-coordinate) and (left knee x-coordinate is at least 5 pixels from left hip x-coordinate) and (right ankle y-coordinate is at least 5 pixels from right knee y-coordinate) and (left knee y-coordinate is at least 5 pixels from left ankle y-coordinate)
   angle between left knee, left hip, and vertical axis from left hip is more than 20 degrees and less than or equal to 90 degrees
   angle between left knee, right knee, and vertical axis from right knee is less than 60 degrees
   angle between right ankle, right knee, and vertical axis from right knee is greater than 150 degrees
  ii. Right Knee y-coordinate above right hip y-coordinate or above left hip y-coordinate
   Catcher not detected (see (b) above)
   (right ankle y-coordinate does not equal left ankle y-coordinate) and (right knee y-coordinate does not equal left knee y-coordinate) and (right hip y-coordinate does not equal left hip y-coordinate)
   (right knee x-coordinate is at least 5 pixels distance away from left knee x-coordinate) and (right knee x-coordinate is at least 5 pixels from right hip x-coordinate) and (right ankle y-coordinate is at least 5 pixels from right knee y-coordinate) and (left knee y-coordinate is at least 5 pixels from left ankle y-coordinate)
   angle between right knee, right hip, and vertical axis from right hip is more than 20 degrees and less than or equal to 90 degrees
   angle between right knee, left knee, and vertical axis from left knee is less than 60 degrees
   angle between left ankle, left knee, and vertical axis from left knee is greater than 150 degrees If all the conditions of (i) or (ii) are met, a pitch may be labeled as detected and a clip may be generated as previously disclosed.

The specific dimensions and angles described herein are provided as examples only, and other values may be used based on, for example, the specific action being analyzed, the relative size of the pitcher (adult, teen, child, etc.), the quality of the captured video, and the like. In some cases, ranges of values may be used instead of a single threshold, with more weight being given to values that occur in the middle of the range. In other embodiments, specific cutoff values corresponding to those disclosed or other desired values may be used.

In some embodiments, it may be desirable to adjust the segmentation parameters to achieve a higher accuracy or reduced the computation resources required. For example, the stride and/or the number of consecutive frames indicating a positive pitch signal to use in order to indicate the occurrence of a pitch may be altered accordingly. If greater accuracy is desired at the expense of computation time, the stride may be decreased and the number of consecutive frames may be increased. Essentially, the number of consecutive frames represents the number of consecutive positive pitch signals to detect before generating a clip. Decreasing the stride means the algorithm analyzes more frames, so it follows that requiring more than 1 consecutive positive pitch signal and analyzing more frames will grant more robustness in the performance.

As previously noted, systems and techniques disclosed herein may have significant advantages over conventional movement and key event analysis techniques. For example, the use of virtual cameras as previously disclosed allows for matching of 2D signatures to be performed from any uncalibrated camera angle due to the high number of 2D signatures that can be matched to each 3D model in the seed database. Furthermore, such comparisons and computations cannot reasonably be performed in any useful timeframe by a human observer such as a coach, and thus cannot be achieved without the automated computer-based embodiments disclosed herein.

The techniques disclosed herein also allow for other analysis than the specific calculations described. For example, measurements may be extracted from videos, such as running speed, jump or stride distance, range of movement, and the like.

Embodiments disclosed herein may use conventional pose estimators to identify poses as previously disclosed. However, the complete techniques disclosed herein may have significant performance advantages over conventional pose estimators when used alone due to the unique combination of 3D pose data with associated 2D projections and simulated camera views. This combination may allow the techniques disclosed herein to eliminate or reduce errors common to conventional pose estimation algorithms, such as where overlapping body parts become indistinguishable to a pose estimator used alone.

As used herein, the term "computer-implemented," descriptions that a computerized system or system performs a process, or equivalents, refer to performance of calculations and other processes by a computing device comprising a processor, memory, and other components operating in concert to perform the calculation, without human intervention other than as specifically disclosed. That is, if a process is disclosed as being performed by the system or as being computer implemented, the process excludes performance of those functions by a human being.

Various embodiments of as disclosed herein may include or be embodied in the form of computer-implemented processes and apparatuses for practicing those processes. Embodiments also may be embodied in the form of a computer program product having computer program code containing instructions embodied in non-transitory and/or tangible media, including any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
    receiving an uncalibrated video showing performance of an action by a human subject;
    extracting a plurality of two-dimensional (2D) poses of the human subject while performing the action based on an arrangement of keypoints on the human subject in one or more frames of the uncalibrated video, the keypoints comprising repeatably-identifiable points on the human subject, wherein the 2D poses comprise discrete arrangements of portions of the human subject relative to one another;
    based upon the 2D poses, detecting one or more key events in the uncalibrated video, each of the key events corresponding to a predefined portion of the action corresponding to a specific temporal event occurring during performance of the action by the human subject;
    based upon the key events, computing one or more mechanical variables of the human subject performing the action, the mechanical variables describing a physical arrangement of at least a part of the human subject performing the action; and
    based upon the one or more mechanical variables, automatically providing information about performance of the action by the human subject, the information indicating at least one portion of the action that was performed sub-optimally by the human subject.

2. The method of claim 1, wherein the plurality of 2D poses are selected from library of predefined two-dimensional (2D) signatures for the action based on the arrangement of keypoints.

3. The method of claim 2, wherein each 2D signature in the library corresponds to a 2D projection of the action as seen from a corresponding point of view.

4. The method of claim 2, wherein the 2D signatures are based upon a plurality of three-dimensional (3D) motion patterns previously obtained from 3D seed data.

5. The method of claim 4, wherein the 3D seed data comprises motion capture data.

6. The method of claim 4, wherein the 3D seed data comprises simulated motion data.

7. The method of claim 1, further comprising:
    prior to receiving the uncalibrated video, generating a library of predefined 2D signatures for the action based upon a plurality of 3D motion patterns obtained from 3D seed data.

8. The method of claim 1, wherein the information further comprises an identification of one or more exercises, drills, or activities to perform to cause an improvement in the portion of the action that was performed sub-optimally by the human subject.

9. The method of claim 1, wherein the action is a pitch by a baseball pitcher.

10. The method of claim 9, wherein the key events comprise one or more selected from the group consisting of: a front foot lift, a max leg lift, a foot strike, a max hip and shoulder separation, shoulders squared up to target, and ball release.

11. A system comprising:
    a processor configured to:
        receive an uncalibrated video showing performance of an action by a human subject;
        extract a plurality of two-dimensional (2D) poses of the human subject while performing the action based on an arrangement of keypoints on the human subject in one or more frames of the uncalibrated video, the keypoints comprising repeatably-identifiable points on the human subject, wherein the 2D poses comprise discrete arrangements of portions of the human subject relative to one another;
        based upon the 2D poses, detect one or more key events in the uncalibrated video, each of the key events corresponding to a predefined portion of the action corresponding to a specific temporal event occurring during performance of the action by the human subject;
        based upon the key events, compute one or more mechanical variables of the human subject performing the action, the mechanical variables describing a physical arrangement of at least a part of the human subject performing the action; and
        based upon the one or more mechanical variables, automatically determine information about performance of the action by the human subject, the information indicating at least one portion of the action that was performed sub-optimally by the human subject; and
    a user interface comprising a display, the interface capable of providing the information about the performance of the action by the human subject.

12. The system of claim 11, wherein the plurality of 2D poses are selected from a library of predefined two-dimensional (2D) signatures for the action based on the arrangement of keypoints.

13. The system of claim 11, further comprising a computerized video capture device configured to capture the uncalibrated video.

14. The system of claim 12, wherein the video capture device comprises a phone or tablet with an integrated camera.

15. The system of claim 11, wherein the information further comprises an identification of one or more exercises, drills, or activities to perform to cause an improvement in the portion of the action that was performed sub-optimally by the human subject.

16. The system of claim 11, wherein the action is a pitch by a baseball pitcher.

17. A non-transitory computer-readable medium storing a plurality of instructions which, when executed by a processor, cause the processor to:
    receive an uncalibrated video showing performance of an action by a human subject;

extract a plurality of two-dimensional (2D) poses of the human subject while performing the action based on an arrangement of keypoints on the human subject in one or more frames of the uncalibrated video, the keypoints comprising repeatably-identifiable points on the human subject, wherein, the 2D poses comprise discrete arrangements of portions of the human subject relative to one another;

based upon the 2D poses, detect one or more key events in the uncalibrated video, each of the key events corresponding to a predefined portion of the action corresponding to a specific temporal event occurring during performance of the action by the human subject;

based upon the key events, compute one or more mechanical variables of the human subject performing the action, the mechanical variables describing a physical arrangement of at least a part of the human subject performing the action; and based upon the one or more mechanical variables, automatically determine information about performance of the action by the human subject, the information indicating at least one portion of the action that was performed sub-optimally by the human subject; and display, on a user interface, the information about the performance of the action by the human subject.

18. The non-transitory computer-readable medium of claim 17, wherein the plurality of 2D poses are selected from a library of predefined two-dimensional (2D) signatures for the action based on the arrangement of keypoints.

19. The system of claim 12, wherein each 2D signature in the library corresponds to a 2D projection of the action as seen from a corresponding point of view.

20. The system of claim 12, wherein the 2D signatures are based upon a plurality of three-dimensional (3D) motion patterns previously obtained from 3D seed data.

21. The system of claim 20, wherein the 3D seed data comprises motion capture data.

22. The system of claim 20, wherein the 3D seed data comprises simulated motion data.

23. The system of claim 11, the processor further configured to:
generate a library of predefined 2D signatures for the action based upon a plurality of 3D motion patterns obtained from 3D seed data prior to receiving the uncalibrated video.

24. The system of claim 16, wherein the key events comprise one or more selected from the group consisting of: a front foot lift, a max leg lift, a foot strike, a max hip and shoulder separation, shoulders squared up to target, and ball release.

25. The non-transitory computer-readable medium of claim 18, wherein each 2D signature in the library corresponds to a 2D projection of the action as seen from a corresponding point of view.

26. The non-transitory computer-readable medium of claim 18, wherein the 2D signatures are based upon a plurality of three-dimensional (3D) motion patterns previously obtained from 3D seed data.

27. The non-transitory computer-readable medium of claim 26, wherein the 3D seed data comprises motion capture data.

28. The non-transitory computer-readable medium of claim 26, wherein the 3D seed data comprises simulated motion data.

29. The non-transitory computer-readable medium of claim 17, the instructions further causing the processor to:
generate a library of predefined 2D signatures for the action based upon a plurality of 3D motion patterns obtained from 3D seed data prior to receiving the uncalibrated video.

30. The non-transitory computer-readable medium of claim 17, wherein the information further comprises an identification of one or more exercises, drills, or activities to perform to cause an improvement in the portion of the action that was performed sub-optimally by the human subject.

31. The non-transitory computer-readable medium of claim 17, wherein the action is a pitch by a baseball pitcher.

32. The non-transitory computer-readable medium of claim 31, wherein the key events comprise one or more selected from the group consisting of: a front foot lift, a max leg lift, a foot strike, a max hip and shoulder separation, shoulders squared up to target, and ball release.

33. The method of claim 1, wherein the action is a golf swing.

34. The method of claim 33, wherein the key events comprise one or more selected from the group consisting of: a peak of the golf swing between a backswing and a downswing, a moment of ball impact, an initial follow-through, and a final position.

35. The method of claim 1, wherein the action is selected from a group consisting of: a boxing punch, a basketball freethrow, a hockey slapshot, and a tennis swing.

36. The system of claim 11, wherein the action is a golf swing.

37. The system of claim 36, wherein the key events comprise one or more selected from the group consisting of: a peak of the golf swing between a backswing and a downswing, a moment of ball impact, an initial follow-through, and a final position.

38. The system of claim 11, wherein the action is selected from a group consisting of: a boxing punch, a basketball freethrow, a hockey slapshot, and a tennis swing.

39. The non-transitory computer-readable medium of claim 17, wherein the action is a golf swing.

40. The non-transitory computer-readable of claim 39, wherein the key events comprise one or more selected from the group consisting of: a peak of the golf swing between a backswing and a downswing, a moment of ball impact, an initial follow-through, and a final position.

41. The non-transitory computer-readable medium of claim 17, wherein the action is selected from a group consisting of: a boxing punch, a basketball freethrow, a hockey slapshot, and a tennis swing.

* * * * *